(12) United States Patent  
Zehavi

(10) Patent No.: US 7,337,230 B2
(45) Date of Patent: Feb. 26, 2008

(54) METHOD AND SYSTEM FOR ELIMINATING REDUNDANT RULES FROM A RULE SET

(75) Inventor: Abraham Zehavi, Nahariya (IL)

(73) Assignee: International Business Machines Corporation, Armonk, NY (US)

( * ) Notice: Subject to any disclaimer, the term of this patent is extended or adjusted under 35 U.S.C. 154(b) by 840 days.

(21) Appl. No.: 10/213,808

(22) Filed: Aug. 6, 2002

(65) Prior Publication Data

US 2004/0030786 A1   Feb. 12, 2004

(51) Int. Cl.
*G06F 15/16* (2006.01)
*G06F 15/173* (2006.01)

(52) U.S. Cl. .................. 709/229; 709/227; 709/239; 709/240; 370/252; 370/254

(58) Field of Classification Search ........ 709/225–229, 709/238; 713/200–207; 717/8–9; 707/2, 707/13, 6, 5, 101
See application file for complete search history.

(56) References Cited

U.S. PATENT DOCUMENTS 5,918,232 A * 6/1999 Pouschine et al. ...... 707/103 R
6,069,892 A * 5/2000 Tochio ..................... 370/395.5
6,438,741 B1 * 8/2002 Al-omari et al. ............... 707/2
6,606,710 B2 * 8/2003 Krishnan et al. ............. 726/13
6,691,168 B1 * 2/2004 Bal et al. ..................... 709/238
6,816,877 B2 * 11/2004 Park et al. .................. 708/628
6,941,303 B2 * 9/2005 Perrizo .......................... 707/6

* cited by examiner

*Primary Examiner*—David Wiley
*Assistant Examiner*—Jude J Jean-Gilles

(57) ABSTRACT

A computer implemented method and system determines whether a rule R is redundant with respect to a rule set S containing a plurality of non-redundant rules each defining tests for performing on a corresponding numeric field. A new rule set S' is generated containing for each rule $R_i$ in S its intersection with R ($R_i$) where R and $R_i$ intersect; and respective numbers of packets that satisfy R and the union of all rules in S' are calculated. If these numbers are equal the rule R is redundant with respect to the rule set S. Any arbitrary set of rules may be processed using such an approach so as to generate a new rule set that contains no redundant rules by determining whether each rule is redundant with respect to an initially empty rule set S1 and adding only those rules that are not redundant to the rule set S1.

12 Claims, 5 Drawing Sheets

METHOD AND SYSTEM FOR ELIMINATING REDUNDANT RULES FROM A RULE SET

FIELD OF THE INVENTION

This invention relates to the removal of redundancies in rules sets, in particular, where the rules relate to classification of network communication packets.

BACKGROUND OF THE INVENTION

A known problem in computerized evaluation of data for determining whether the data conforms to predefined rules relates to the need to avoid redundant rules in the rules set. This applies particularly when an item to be checked can legitimately conform to more than one rule in the rules set, since this requires that the item be checked against each rule in the rules set. Thus, redundancies in the rules set are wasteful of computer resources in that more memory is required to store the rules set and more processing time is needed for determining with which rules the item conforms. It is therefore desirable to remove redundancies from the rules set prior to checking.

One particular area where rule checking is required, is the field of network classification tables. Suitable background is provided in U.S. Pat. No. 5,956,721 (Douceur et al.) issued Sep. 21, 1999 and entitled "Method and computer program product for classifying network communication packets processed in a network stack". Data packets (referred to simply as "packets") sent through a communication network are classified according to message type, for example. The message type is transmitted with the packet in a header thereof, which may contain other classification data. On receipt, packets are passed up the message stack, each element of which may remove a portion of the header information and make processing decisions based on the information in the packet or any header information that has not been previously removed by lower level drivers.

A packet is classified for certain processing in a given driver based on information about the packet that is contained in the headers or elsewhere in the body of the message itself. Usually a single best classification must be returned and this requires that rules be implemented to cater for overlapping conditions. The rules are stored in a database and U.S. Pat. No. 5,956,721 relates to a method for classifying packets for processing by multiple drivers in a network stack by multiple drivers.

Classification of data packets in network communication is also described in WO 99/27684, which describes a method for classifying traffic according to a definable set of classification attributes, which may be hierarchical and define a policy or rule of assignment for flow of data traffic through the network. According to one embodiment, the classification process checks at each level if the flow being classified matches the attributes of a given class. If it does, then processing continues down to the links in the classification hierarchy. If it does not, then the class at the level that does match determines the policy for the flow being classified.

It is not uncommon for a packet to conform to multiple rules, which may even contradict each other. This problem is resolved by partial ordering whereby relative priorities are assigned between contradictory rules. It may also occur that the set of rules contains redundant rules which are never executed. This may happen when for each packet satisfying such a rule there is higher priority rule which the packet also satisfies. As a result the rule set is larger than necessary, thus increasing the time required to search for matching rules.

Given that the rule sets are large and complex, it is not feasible to detect redundant rules manually.

U.S. Pat. No. 5,943,667 (Aggarwal et al.) issued Aug. 24, 1999 and entitled "Eliminating redundancy in generation of association rules for on-line mining" discloses a computer method of removing simple and strict redundant association rules generated from large collections of data. A compact set of rules is presented to an end user being devoid of many redundancies in the discovery of data patterns. The method is directed primarily to on-line applications such as the Internet and Intranet. Given a number of large item sets as input, simple redundancies are removed by generating all maximal ancestors, the frontier set, for each large item set. The set of maximal ancestors share a hierarchical relationship with the large item set from which they were derived and further satisfy an inequality whereby, the ratio of respective support values is less than the reciprocal of some user defined confidence value. The resulting compact rule set is displayed to an end user at some specified level of support and confidence. The method is also able to generate the full set of rules from the compact set.

SUMMARY OF THE INVENTION

It is therefore an object of the invention to provide an improved method and system for removing redundant rules from a rule set.

A further object of the invention is to provide an improved method and system for determining that a new rule is not redundant with respect to a rule set prior to adding the new rule thereto.

According to the invention, there is provided a computer implemented method for determining whether a rule R is redundant with respect to a rule set S containing a plurality of non-redundant rules each defining tests of varying type for performing on a corresponding numeric field in a packet P of fields $(p_1, \ldots p_n)$ such that each field is associated with a specific type of test, which may be blank, such that the intersection of two intersecting rules is a rule and wherein the packet P satisfies a rule if each field satisfies the corresponding test in the rule or if the corresponding test is blank, said method comprising:

(a) generating a new rule set S' containing for each rule $R_i$ in S its intersection with R where R and $R_i$ intersect; and (b) determining that the rule R is redundant with respect to the rule set S if an equal number of packets satisfies R and the union of all rules in S'.

Such a method eliminates redundant rules when the packets satisfied by a rule are satisfied also by a combination of existing rules (none is maximal) of higher priority. In this context, it should be noted that rules are arranged by priorities. This means that if there is a conflict and a packet belongs to two rules, the rule with the highest priority is used. According to the invention, we say that given an existing set of rules a new rule is redundant if every packet which satisfies the new rule is satisfied by one of the existing rules. We can apply this if we take rules with higher priority. There is an alternative approach where we say that the rule is redundant if its removal does not change the behavior of the whole system. In the second approach we can remove the rule and a rule with a lower priority will perform similar to the removed rule. A rule is maximal if it is not included in any other rule.

In FIG. 1 there is illustrated such a case where one rule is included in the union of three other rules having higher priority. It is assumed that in this case we check two variables in the header where each variable is checked against a lower and higher bound. Thus each rule can be represented as a rectangle. The rule we check is represented as a black rectangle and the included rules are represented as vertically and horizontally shaded rectangles.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

Figure 1:
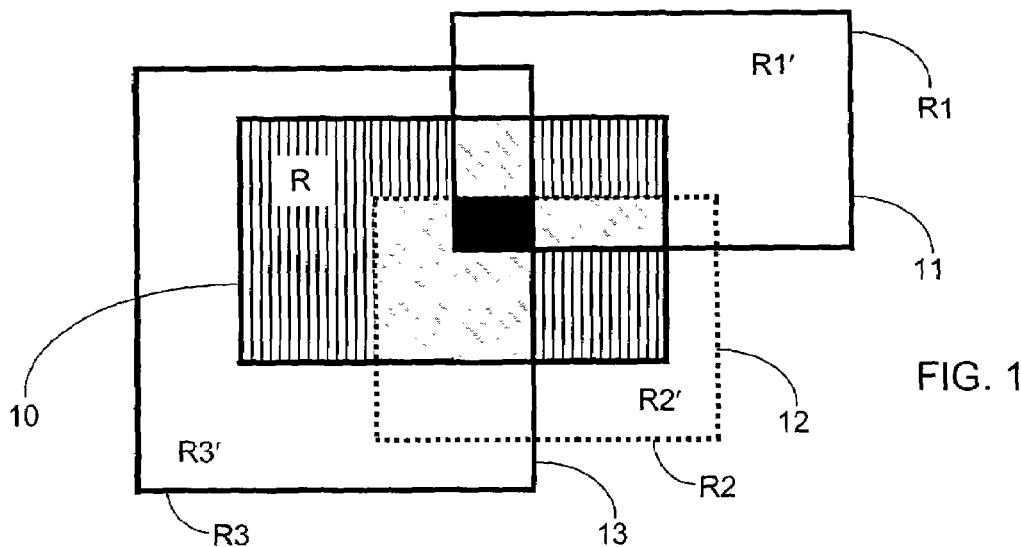
FIG. 1 is a pictorial diagram useful in understanding the principle of the invention.
Figure 2:
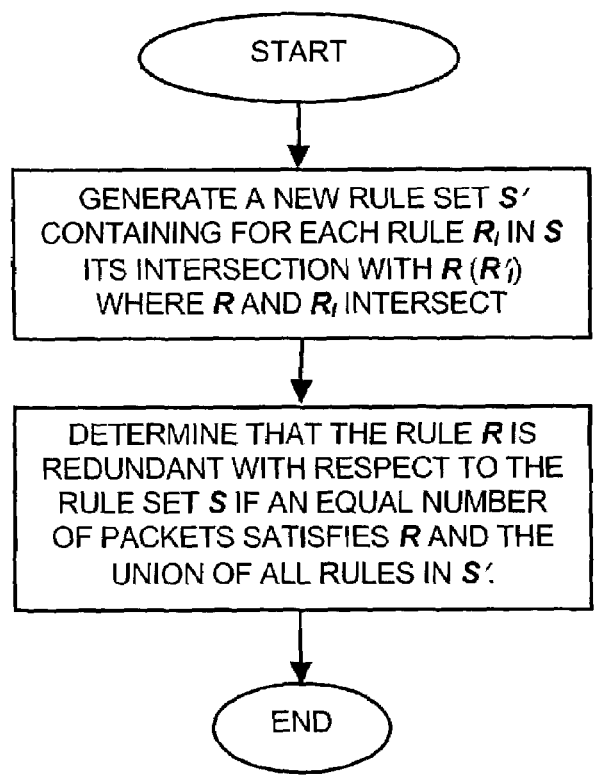
FIG. 2 is a flow diagram showing the principal operations carried out by a method according to a first aspect of the invention.

Referring to FIG. 1, there is shown a rule R denoted by a rectangle 10 having a solid border and three additional rules R1, R2 and R3 denoted by respective rectangles 11, 12 and 13 having solid, dashed and solid borders respectively. It is seen that rule R is redundant. As shown in FIG. 2, the algorithm first removes the portions of the rules R1, R2 and R3 that do not intersect R, these being the portions in the drawing that are white, and are denoted by R1', R2' and R3'. The number of packets is then calculated that are satisfied by R, being the area of the rectangle 10 and this is compared to area of the union of the intersections of the three rules R1, R2 and R3 with R.

This is done by computing and summing the remaining area of each rule. The vertically crosshatched portions indicate the intersection of the rule R with one of the rules R1, R2 and R3. However the diagonally crosshatched portions corresponding to intersecting pairs of rules from R1, R2 and R3 are added twice and the common intersection between all rules constituted by the central black portion is computed three times. So the area of the rectangles representing intersections between pairs of rules from R1, R2 and R3 has to be subtracted. This takes care of the diagonally crosshatched portions but the central black square is subtracted three times instead of two, and so the common intersection of all three rules R1, R2 and R3 has to be added. The result is the area of the union of R1, R2 and R3 and as this is equal to the area of the rectangle R, the rule R is redundant.

The invention is based on two algorithms that will now be described in detail.

First Algorithm

The first algorithm is predicated on the condition that the intersection of two intersecting rules is a rule. This condition is fulfilled, for example, by interval test where a field is checked against a lower and upper bound, or mask and value test where a field is masked and then compared to a value. The invention will be described with specific regard to these tests, but it is to be understood that this does not detract from the generality of the invention, which can be applied wherever this condition is fulfilled. That this condition applies for interval type tests and for mask and value type tests can be seen as follows. Suppose we have two rules R1 and R2. If the tests performed on a field x is of an interval type, such that x fulfils the rules if:

$R1\ low1 \leq x \leq high1$ $R2\ low2 \leq x \leq high2$ then we can use for the intersecting rule the condition:

$maximum(low1, low2) <= x <= minimum(high1, high2)$

As the rules intersect this is a non-empty interval type test.

If the test performed of field x is of a mask and value type, such that x fulfils the rules if:

$R1\ x\ \&\ mask1=value1$ $R2\ x\ \&\ mask2=value2$ then we can define for the intersecting rule the test:

$x\ \&\ (mask1|mask2)=(value1|value2)$.

This works because if the rules intersect we must have:

$mask1\ \&\ value2=mask2\ \&\ value1$

This proof of the statement includes also the algorithm for constructing the intersection rule.

Number of Packets Satisfying a Field Test in a Rule

For an interval type of test, $low \leq x \leq high$, the number of possible values is high−low+1. If no test is performed on the given field, then the whole range is assumed giving the number of rules as maximum field value−minimum field value+1.

For a mask and value type of test, x & mask=value, let us denote by mx the number of bits in the field, and by mm the number of non zero bits in mask. Then the number of different values satisfying the test is 2**(mx−mm). If no test is specified for this field we can use the interval approach.

We call the number of packets satisfying a field f test in a rule R the volume of f in R (V(f,R))

Number of Packets Satisfying a Rule R (Volume of R V(R))

From the above it can be seen that V(R) is the multiplication of the values of all volumes of fields in R.

Second Algorithm for Redundant Rule Detection (Adding a Rule to an Existing Set)

The first step assumes that we have a set of rules S that contains no redundant rules with respect to which we need to determine whether a new rule R is redundant.

As the first step, we use the first algorithm to generate a new set S' obtained by replacing each rule Ri in S by its intersection with R (Ri'). If R and Ri do not intersect, Ri is removed.

The second step counts the number of packets satisfying R and compares them to the number of packets satisfying the union of all rules in S'. If the numbers are equal then R is redundant The number of packets complying with the rules in S' is given by the following formula (referred to below as Formula 1):

$\Sigma$(volume of all rules in S')$-\Sigma$(volumes of all intersections of two rules in S')$+\Sigma$(all intersections of three rules in S')$-\ldots$ Algorithm 2—Summary 1) Compute S' intersection set of rules between S and R (use algorithm 1)
2) Compute V(R)
3) Using formula 1 compute number of packets satisfying the rules in S'
4) If results from 2) and 3) are the same then the rule R is redundant.

Figure 3:
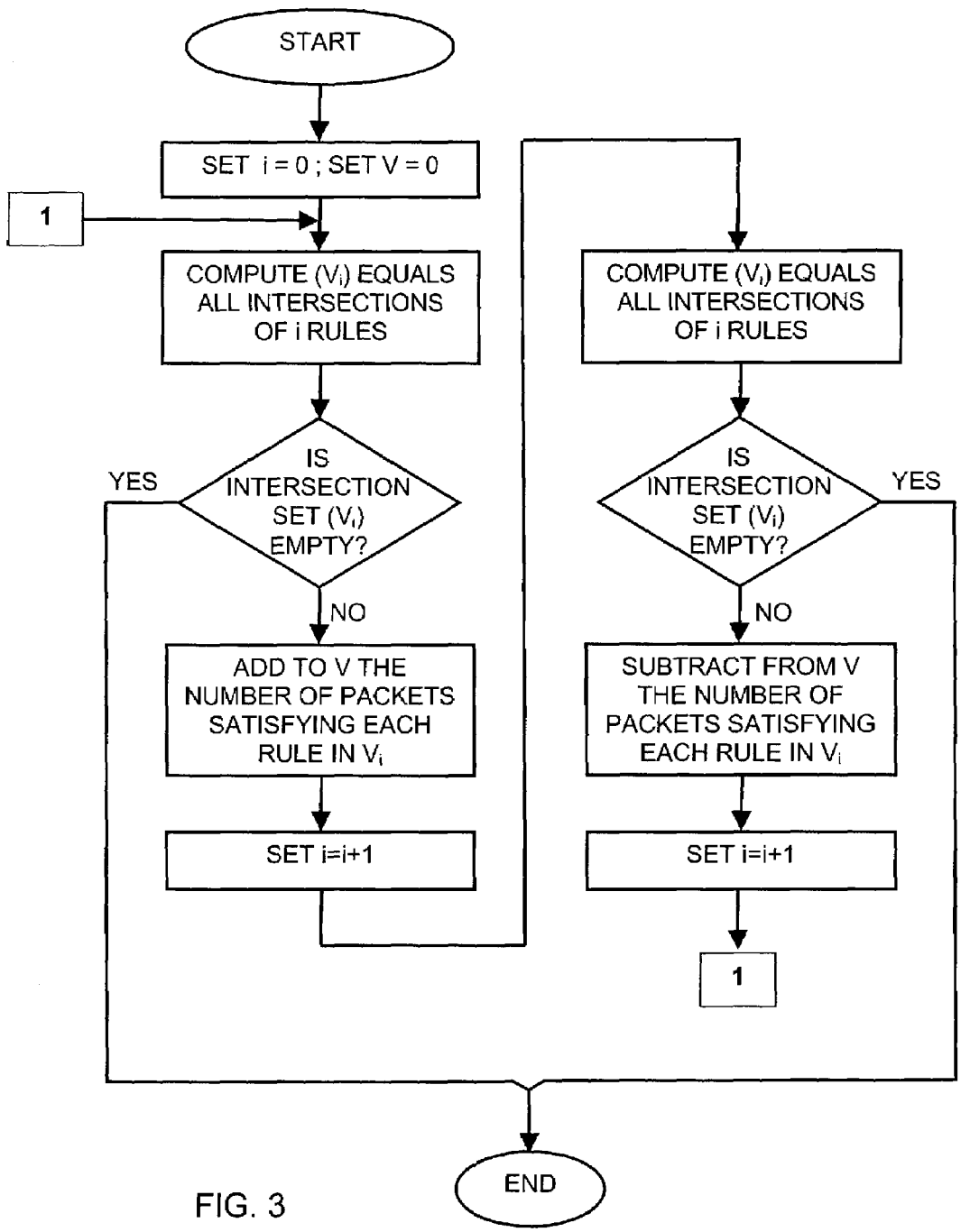
FIG. 3 is a flow diagram showing the principal operations carried out according to a specific implementation of the method shown in FIG. 2.

FIG. 3 is a flow diagram summarizing an alternative way of expressing the second algorithm. After computing from S the new set S' of rules intersecting with R we do the following to compute the number of packets V satisfying the union of rules.

1) set i=1;
2) set V=0;
3) compute $V_i$ equal to all intersections of i rules;
   3.1 if the intersection set is empty (i.e. $V_i$=EMPTY) terminate and return V;
   3.2 add to V the number of packets satisfying each rule in Vi (Volume of all rules in $V_i$);
4) set i=i+1;
5) compute $V_i$ equal to all intersections of i rules;
   5.1 if the intersection set is empty (i.e. $V_i$=EMPTY) terminate and return V;
   5.2 Subtract from V the number of packets satisfying each rule in Vi (the volume of each rule in Vi);
6) set i=i+1;
7) goto 3

It should be noted that when i=1, the intersection set is S' itself.

Combining the two algorithms, the following results:
Given S and R:
1) Compute S' intersection of all rules in S with R
2) Use A to compute the number of packets satisfying the union of the rules in S'
3) Compute the number of packets satisfying R
4) If the results from steps 2 and 3 are identical R is redundant.

Third Algorithm for Redundant Rule Detection

This algorithm lets us test a set S for redundant rules using the following operations:
1) Start with an empty set S1 and S2
2) For each rule R in S:
   2.1) If R is not redundant relative to S1 add it to S1 otherwise add it to S2.
3) Proceed step 2 with next rule in S.

On completion of the algorithm S1 is a set of non-redundant rules and S2 is the set of redundant rule. As usually the number of rules having common intersection is not high, the sum in Formula 1 should not be too long.

EXAMPLE

By way of specific example, consider the following four sets of rules each denoting that a respective pair of integer numbers operated on thereby must lie between a specified interval; and further limiting specified binary bits of a third integer number to a specified value. Thus, the rules apply conditions that may be expressed as:
i) a condition [a,b] for variable x means $a \leq x \leq b$.
ii) a condition a&b for variable z means z&a=b.

R1
[13,28] [20,48] 5&0
R2
[13,28] [20,48] 5&4
R3
[7,14] [22,35]
R4
[6,13] [33,44]

Hence, [13, 28] denotes an interval extending from 13 to 28, inclusive, thus containing 16 integer values. Likewise, [20,48] denotes an interval extending from 20 to 48, inclusive, thus containing 29 integer values. There are also associated with rule sets R1 and R2 a mask and value that limits specified binary bits of integer numbers operated on thereby to specified values. The mask indicates which bits of the number operated on thereby must be limited to the specified value. Thus, in the case of R1, the mask is five and the value is zero. The mask, 5, in binary, is equivalent to "101" thus indicating that the $1^{st}$ and $3^{rd}$ least significant bits of a number operated on thereby must be equal to the corresponding bits of the value i.e. zero. The $2^{nd}$ binary bit of the mask is "0", thus indicating that this bit does not mask the corresponding bit of the value, and that therefore the $2^{nd}$ least significant bit of a number operated on by this rule can be either "0" or "1". For each rule set, each rule operates on a different integer value in the data header. Thus, denoting these values by x, y and z, the first rule [13,28] in the rule set R1 operates on x, the second rule [20,48] in the rule set R1 operates on y, and the third rule 5&0 in the rule set R1 operates on z.

In the case of R2, the mask is again five but this time the value is four. The value 4 is "100" in binary and the mask, 5, in binary, is equal to "101". Thus, the $1^{st}$ least significant bit of a number operated on by this rule must be zero while the $3^{rd}$ least significant bit of a number operated on thereby must be one. Any other bit can be either zero or one. Thus, $12_{10}$ equal to $1100_2$ satisfies the rule, while $7_{10}$ equal to $111_2$ does not.

Thus, the four rule sets impose the following conditions:
R1
[13,28] [20,48] 5&0
  $13 \leq x \leq 28$
  $20 \leq y \leq 48$
  bits 0 and 2 of z must be zero
R2
[13,28] [20,48] 5&4
  $13 \leq x \leq 28$
  $20 \leq y \leq 48$
  bits 0, and 2 of z must be 0 and 1 respectively.
R3
[7,14] [22,35]
  $7 \leq x \leq 14$
  $22 \leq y \leq 35$
R4

[6,13] [33,44]
    $6 \leq x \leq 13$
    $33 \leq y \leq 44$

Consider now that a new rule R is to be added to the rule set:
R
[10,20] [30,40] 3&0

Some assumption must be made about the length of the third variable since only specific bits thereof are constrained by the mask, and therefore the number of possible variables that obey the rule depends on their length. For the sake of explanation, it is assumed that the third variable has a length of 4-bits, but it will clearly be understood that the invention is not limited to the length of variables or data packets used therewith.

Since the criteria in each of the rules are independent of each other, the number of data packets that meet all criteria in each rule is equal to the product of the number of data packets meeting each respective criterion. Thus, the number of data packets that meet all criteria in the new rule, R, may be denoted V(R) and calculated as follows:

$$V(R)=(20-10+1)*(40-30+1)*(2**(4-2))$$
$$=11*11*4=484$$

As noted above, the first operation carried out by the method requires that the intersections of R1, R2, R3, R4 with R be computed, so as thereby to obtain a new set of rules:
R1
[13,20] [30,40] 7&0
R2
[13,20] [30,40] 7&4
R3
[10,14] [20,35] 3&0
R4
[10,13] [33,40] 3&0

$$V(R1)=8*11*(2**(4-3))=176$$

$$V(R2)=8*11*(2**(4-3))=176$$

$$V(R3)=5*6*(2**(4-2))=120$$

$$V(R4)=4*8*(2**(4-2))=128$$

$$V1=V(R1)+V(R2)+V(R3)+V(R4)=600$$

Now we have to look at intersection of pairs of rules and subtract this from V1:

R1, R2 do not intersect since they conflict on the third condition.
R1, R3 is [13,14] [30,35] 7&0 V=2*6*2=24
R1, R4 is [13,13] [33,40] 7&0 V=1*8*2=16
R2, R3 is [13,14] [30,35] 7&4 V=2*6*2=24
R2, R4 is [13,13] [33,40] 7&4 V=1*8*2=16
R3, R4 is [10,13] [33,35] 3&0 V=4*3*4=48

$$V2=24+16+24+16+48=128$$

$$V1-V2=472$$

Now we have to add the intersections of all three rules. As R1 and R2 do not intersect, the intersections of R1, R2, R3 and R1, R2, R4 are both zero, giving only:
R1, R3, R4 which is [13,13] [33,35] 7&0 V=1*3*2=6
R2, R3, R4 which is [13,13] [33,35] 7&4 V=1*3*2=6

$$V3=12$$

So $V1-V2+V3=600-128+12=484$

Clearly, it cannot be larger than the original boundary since the advent of a new rule cannot increase the number of packets meeting all criteria, but can, at most, only reduce it or leave it unchanged. If it is less, then the new rule is not redundant since it means that some data packets that meet the original rules do not meet the new rule.

In the present example, there are no intersections of the four rules and:

$$V(R)=V1-V2+V3=484$$

Therefore R is redundant.

The invention has been described so far with specific reference to integer variables. When working with mask and value there is no relevance to variable type since only the masked bits in the variable are considered. When looking at intervals where packets are actually counted, then the variables must be integers. When integers are used the volume computed is identical to the number of contained packets. If the rule set does not contain the mask and value type test, the area concept can be used and in this case, the variables are not constrained to be integers.

Figure 4:
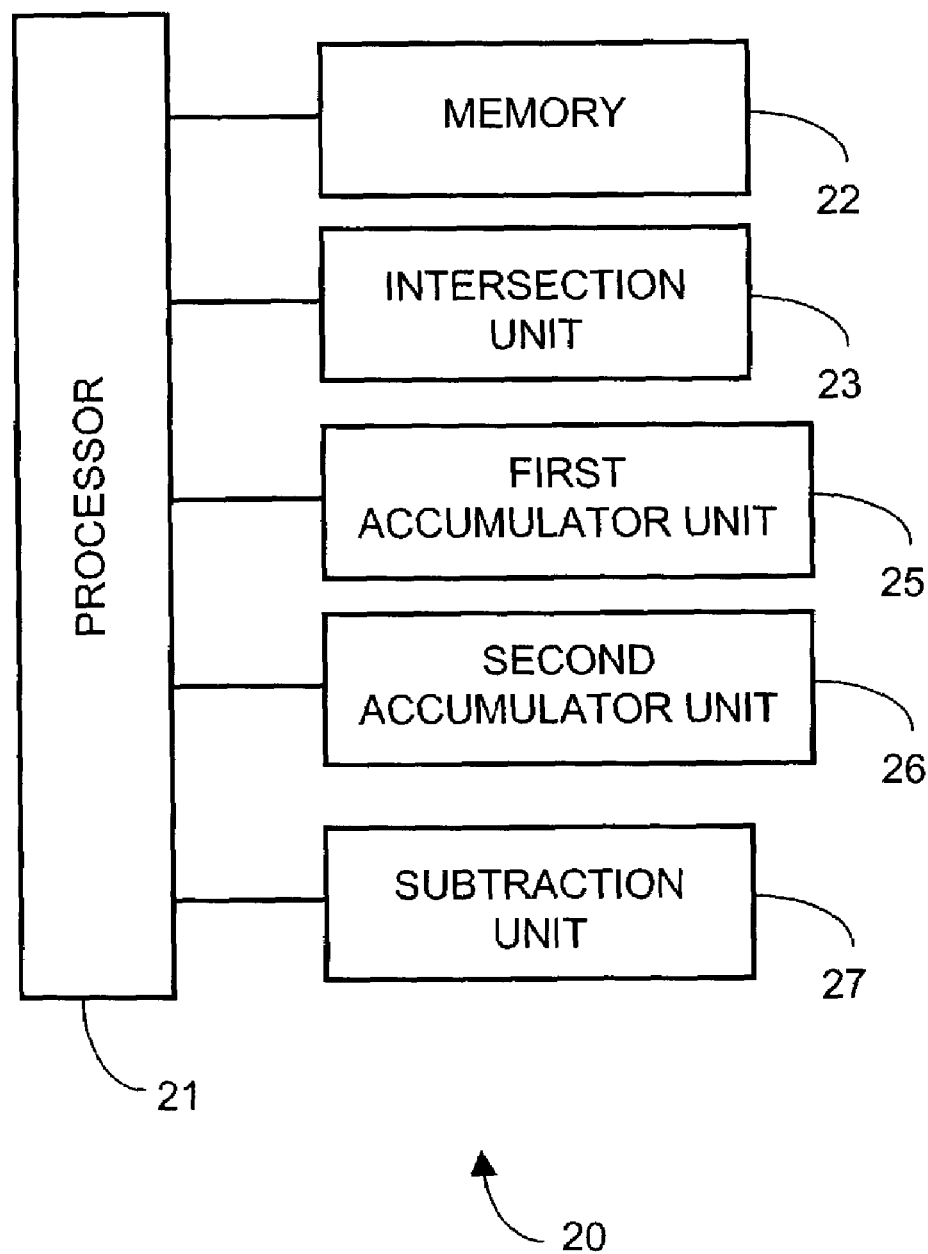
FIG. 4 is a block diagram showing functionally a system for carrying out the method according to the first aspect of the invention.

FIG. 4 shows functionally a system 20 for carrying out the method described above with reference to FIGS. 1 to 3 of the drawings. The system 20 includes a processor 21 coupled to a memory 22 for storing the rule set S as well as a new rule R. Also coupled to the processor 21 is an intersection unit 23 for computing the intersections of each rule in S with R, each intersection constituting a respective rule in a new rule set S'. A first accumulator unit 25 is coupled to the processor 21 for computing the number of packets satisfying R and a second accumulator unit 26 is coupled to the processor 21 for computing the number of packets satisfying the union U of all rules in S'. A subtraction unit 27 is coupled to the processor 21 for computing the difference between the number of packets satisfying the original set R and the number of packets satisfying U. The output of the subtraction unit 27 thus indicates whether the new rule R is redundant or not according to whether the output is zero or greater than zero, respectively.

The invention as described above requires that the initial rule set S contain no redundant rules. However, in a second aspect, the invention may also be used to process a rule set S containing a plurality of rules R so as to generate a rule set containing only non-redundant rules.

Figure 5:
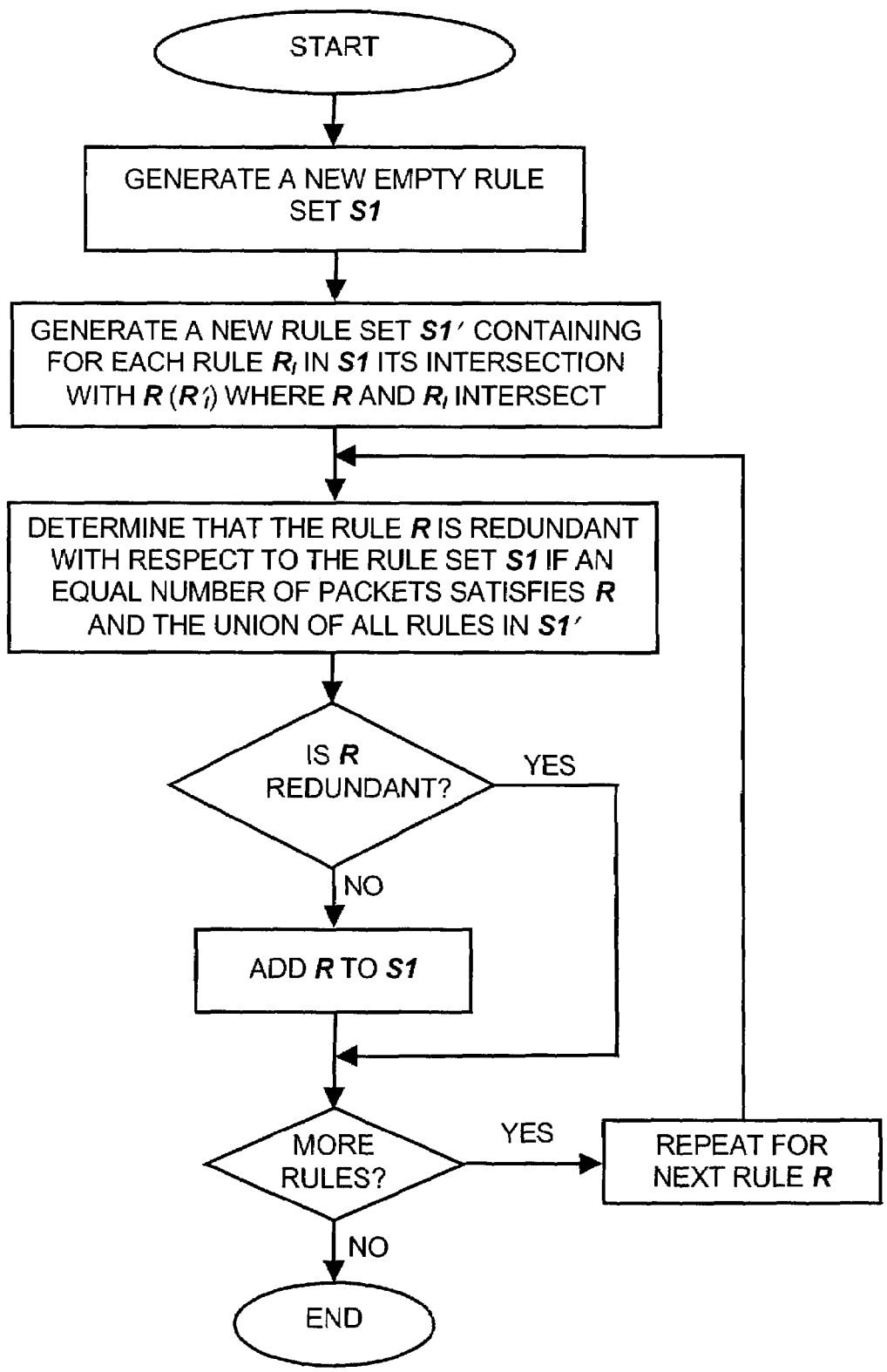
FIG. 5 is a flow diagram showing the principal operations carried out by a method according to a second aspect of the invention.

FIG. 5 shows the principal operations carried out by a method according to the second aspect of the invention. The algorithm starts by generating a new empty rule set S1. For each rule R in S, the algorithm then determines whether R is redundant with respect to S1. This is done using the method described above with reference to FIGS. 1 to 3, namely by generating a new rule set S1' by replacing each rule $R_i$ in S1 by its intersection with R ($R'_i$) where R and $R_i$ intersect, and determining that the rule R is redundant with respect to the rule set S1 if an equal number of packets satisfies R and the union of all rules in S1'. If R is not redundant with respect to S1, R is added to S1. This ensures that only non-redundant rules are added to the initially empty set S1 thus ensuring that S1 contains only non-redundant rules.

Figure 6:
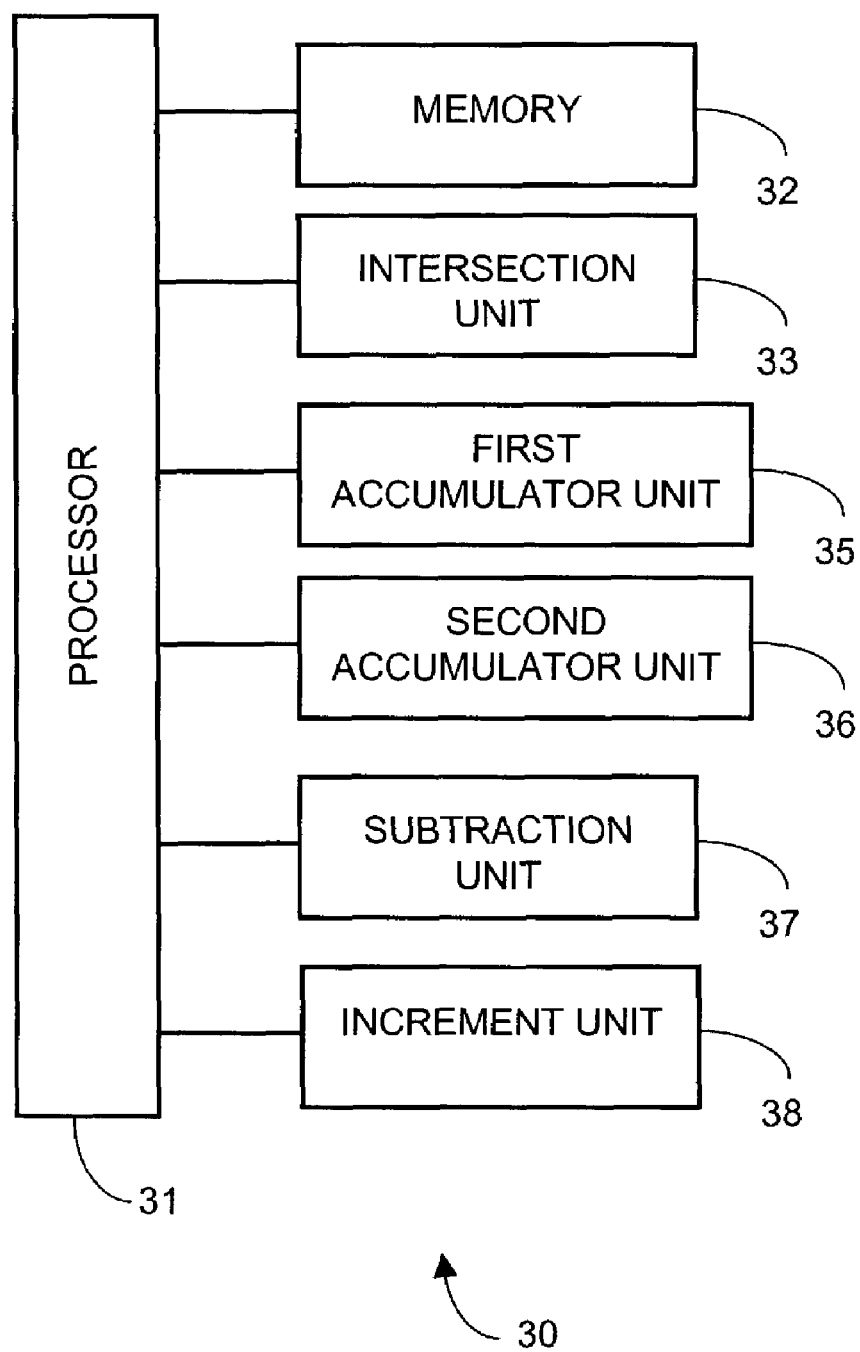
FIG. 6 is a block diagram showing functionally a system for carrying out the method according to the second aspect of the invention.

FIG. 6 shows functionally a system 30 for carrying out the method described above with reference to FIG. 5 of the drawings. The system 30 includes a processor 31 coupled to a memory 32 for storing the rule set S as well as a rule set S1, which is initially set to empty. Also coupled to the processor 31 is an intersection unit 33 for computing for the intersection of each rule $R_i$ in S1 with R ($R'_i$) where R and $R_i$ intersect, each intersection constituting a respective rule in a new rule set S1'. A first accumulator unit 35 is coupled to the processor 31 for computing the number of packets satisfying R and a second accumulator unit 36 is coupled to the processor 31 for computing the number of packets satisfying the union U of all rules in S'. A subtraction unit 37 is coupled to the processor 31 for computing the difference between the number of packets satisfying the original set R and the number of packets satisfying U. The output of the subtraction unit 37 thus indicates whether the new rule R is redundant or not according to whether the output is zero or greater than zero, respectively. An increment unit 38 is coupled to the processor 31 and is responsive to the new rule R being non-redundant for adding it to the rule set S1.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

In the method claims that follow, alphabetic characters and Roman numerals used to designate claim steps are provided for convenience only and do not imply any particular order of performing the steps.

The invention claimed is:

1. A computer implemented method for determining whether a given rule is redundant with respect to a rule set employed in network communication containing a plurality of non-redundant rules for performing on network communication packets, the method comprising:
    applying said given rule to a set of network communication packets;
    applying each rule in said rule set to said set of network communication packets; and
    if all of the network communication packets which satisfy the given rule also satisfy at least one of the rules in said rule set,
        classifying said given rule as redundant; and
        discarding said given rule and not employing it in said network communication.

2. The method according to claim 1, further including:
    adding said given rule to the rule set if said given rule is not classified as redundant.

3. The method according to claim 1, wherein all the numeric fields in said packet are constrained to be integers.

4. A computer implemented method for processing a first rule set employed in network communication containing a plurality of rules so as to generate a second rule set containing only non-redundant rules for performing on network communication packets, the method comprising:
    initializing said second rule set as an empty rule set; and
    for each rule in said first rule set:
        determining whether said rule is redundant with respect to said second rule set, said determining comprising:
            applying said rule to a set of network communication packets;
            applying each rule in said second rule set to said set of network communication packets; and
            if all of the network communication packets which satisfy said rule also satisfy at least one of the rules in said second rule set classifying said rule as redundant; and
        if said rule is not classified as redundant, adding said rule to said second rule set.

5. The method according to claim 4, wherein all the numeric fields in said packet are constrained to be integers.

6. The method according to claim 4, further including:
    initializing a third rule set as an empty rule set; and
    for each rule in said first rule set:
        if said rule is classified as redundant, adding said rule to said third rule set.

7. A system for determining whether a given rule is redundant with respect to a rule set employed in network communications containing a plurality of non-redundant rules for performing on network communication packets, the system comprising:
    a processor coupled to a memory for storing the rule set and the given rule;
    a first evaluator unit coupled to the processor for providing a first output indicating which packets in a set of network communication packets satisfy said given rule;
    a second evaluator unit coupled to the processor for providing a second output indicating which packets in said set of network communication packets satisfy at least one rule of said rule set; and
    a comparison unit coupled to the processor for comparing said first output and said second output,
    said comparison unit classifyin said given rule as redundant if all packets in said first output are included in said second output.

8. A system for processing a first rule set employed in network communication containing a plurality of rules to generate a second rule set containing only non-redundant rules for performing on network communication packets, the system comprising:
    a processor coupled to a memory for storing the first rule set and the second rule set, said processor operative to initialize said second rule set to be an empty set, said processor operative to successively compare each rule from said first rule set with said second rule set;
    a first evaluator unit coupled to the processor for providing a first output indicating which packets in a set of network communication packets satisfy a selected rule from said first rule set;
    a second evaluator unit coupled to the processor for providing a second output indicating which packets in said set of network communication packets satisfy said second rule set; and
    a comparison unit coupled to the processor for comparing said first output and said second output, said comparison unit classifying said selected rule as redundant if all packets in said first output are included in said second output,
    said processor being operative to add said selected rule to said second rule set if said comparison unit does not classify said selected rule as redundant.

9. A computer implemented program storage device readable by machine, tangibly embodying a program of instructions executable by the machine to perform method steps for determining whether a given rule is redundant with respect to a rule set employed in network communication containing a plurality of non-redundant rules for performing on network communication packets, the method comprising:
    applying said given rule to a set of network communication packets;
    applying each rule in said rule set to said set of network communication packets; and
    if all of the network communication packets which satisfy the given rule also satisfy at least one of the rules in said rule set,
        classifying said given rule as redundant; and
        discarding said given rule and not employing it in said network communication.

10. A computer implemented computer program product comprising a computer useable medium having computer readable program code embodied therein for determining whether a given rule is redundant with respect to a rule set employed in network communication containing a plurality of non-redundant rules for performing on network communication packets, the computer program product comprising:
- computer readable program code for causing the computer to apply said given rule to a set of network communication packets;
- computer readable program code for causing the computer to apply each rule in said rule set to said set of network communication packets; and
- computer readable program code for causing the computer to classify said given rule as redundant and to discard said given rule and not employ it in said network communication, if all of the network communication packets which satisfy the given rule also satisfy at least one of the rules in said rule set.

11. A computer implemented program storage device readable by machine, tangibly embodying a program of instructions executable by the machine to perform method steps for processing a first rule set employed in network communication containing a plurality of rules so as to generate a rule set containing only non-redundant rules for performing on network communication packets, the method comprising:
- initializing said second rule set as an empty rule set; and
- for each rule in said first rule set:
  - determining whether said rule is redundant with respect to said second rule set, said determining comprising:
    - applying said rule to a set of network communication packets;
    - applying each rule in said second rule set to said set of network communication packets; and
    - if all of the network communication packets which satisfy said rule also satisfy at least one of the rules in said second rule set classifying said rule as redundant; and
  - if said rule is not classified as redundant, adding said rule to said second rule set.

12. A computer implemented computer program product comprising a computer useable medium having computer readable program code embodied therein for processing a first rule set employed in network communication containing a plurality of rules so as to generate a second rule set containing only non-redundant rules for performing on network communication packets, the computer program product comprising:
- computer readable program code for causing the computer to initialize said second rule set as an empty rule set; and
- computer readable program code for causing the computer to determine, for each rule in said first rule set, whether said rule is redundant with respect to said second rule set, said computer readable program code including:
  - computer readable program code for causing the computer to apply said rule to a set of network communication packets;
  - computer readable program code for causing the computer to apply each rule in said second rule set to said set of network communication packets; and
  - computer readable program code for causing the computer to classify said rule as redundant if all of the network communication packets which satisfy said rule also satisfy at least one of the rules in said second rule set; and
- computer readable program code for causing the computer to add said rule to said second rule set if said rule is not classified as redundant.

* * * * *